US010518633B2

United States Patent
Sekihara et al.

(10) Patent No.: US 10,518,633 B2
(45) Date of Patent: Dec. 31, 2019

(54) FUEL SUPPLY APPARATUS

(71) Applicant: TOYODA GOSEI CO., LTD., Kiyosu-shi, Aichi-ken (JP)

(72) Inventors: Atsushi Sekihara, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 588 days.

(21) Appl. No.: 15/262,093

(22) Filed: Sep. 12, 2016

(65) Prior Publication Data
US 2017/0087982 A1 Mar. 30, 2017

(30) Foreign Application Priority Data
Sep. 28, 2015 (JP) ................................ 2015-189591

(51) Int. Cl.
*B67D 7/32* (2010.01)
*B60K 15/04* (2006.01)
*B60K 15/035* (2006.01)

(52) U.S. Cl.
CPC ............ *B60K 15/04* (2013.01); *B60K 15/035* (2013.01); *B60K 2015/03538* (2013.01); *B60K 2015/03576* (2013.01); *B60K 2015/047* (2013.01)

(58) Field of Classification Search
CPC ................. B60K 15/04; B60K 15/035; B60K 2015/03538; B60K 2015/03576; B60K 2015/047; B60K 2015/0458
USPC .... 220/86.1, 86.2; 141/285, 365, 54, 55, 57, 141/290, 325, 350
See application file for complete search history.

(56) References Cited

U.S. PATENT DOCUMENTS

| 4,722,454 A | * | 2/1988 | Fischer | .................. B60K 15/04 137/587 |
| 5,033,517 A | * | 7/1991 | Bucci | ..................... B60K 15/04 141/286 |
| 5,040,575 A | * | 8/1991 | Oeffling | ........... B60K 15/03519 137/588 |

(Continued)

FOREIGN PATENT DOCUMENTS

JP H07-180627 A 7/1995
JP 2002-283855 A 10/2002

(Continued)

OTHER PUBLICATIONS

Translation of JP2012183887(A), Guide Device for Oil Filling Nozzle, Tachibana Norihide (Year: 2012).*

(Continued)

*Primary Examiner* — Anthony D Stashick
*Assistant Examiner* — Onekki P Jolly
(74) *Attorney, Agent, or Firm* — Posz Law Group, PLC (57) ABSTRACT

A fuel supply apparatus comprises a filler neck body including a fuel passage-forming structure configured to form a fuel passage and a fuel vapor port branched off from the fuel passage-forming structure; and a nozzle guide located inside of the filler neck body and formed in a tubular shape. A vapor flow path is formed to be continuous with the fuel vapor port and introduce fuel vapor flowing into the fuel vapor port in a tank direction. The configuration of the fuel supply apparatus enables the fuel vapor circulated from a fuel tank to the fuel supply apparatus to smoothly join with the flow of liquid fuel supplied from a fueling nozzle.

11 Claims, 8 Drawing Sheets

(56) References Cited

U.S. PATENT DOCUMENTS

| | | | |
|---|---|---|---|
| 5,606,954 A | 3/1997 | Yamazaki et al. | |
| 6,523,582 B2* | 2/2003 | Furuta | B60K 15/04 |
| | | | 141/286 |
| 8,220,508 B2 | 7/2012 | Rongstock | |
| 2002/0134461 A1 | 9/2002 | Furuta | |
| 2007/0108211 A1* | 5/2007 | Zhu | B63B 25/12 |
| | | | 220/367.1 |
| 2007/0169845 A1* | 7/2007 | Benjey | F02M 37/0082 |
| | | | 141/350 |
| 2009/0084464 A1* | 4/2009 | Hagano | B60K 15/04 |
| | | | 141/312 |
| 2017/0190248 A1* | 7/2017 | Kikuya | B60K 15/04 |

FOREIGN PATENT DOCUMENTS

| | | | | |
|---|---|---|---|---|
| JP | 2009-083569 A | 4/2009 | | |
| JP | 2010-195062 A | 9/2010 | | |
| JP | 2012183887 A * | 9/2012 | | B60K 15/04 |
| JP | 2015-143043 A | 8/2015 | | |
| WO | 2012/120983 A1 | 9/2012 | | |

OTHER PUBLICATIONS

Office Action dated Jul. 3, 2018 issued in corresponding CN patent application No. 201610835066.1 (and English translation).
Office action dated Mar. 22, 2019 issued in corresponding CN patent application No. 201610835066.1 (and English translation thereof).

* cited by examiner

FUEL SUPPLY APPARATUS

CROSS-REFERENCE TO RELATED APPLICATION

The present application claims priority from Japanese patent application 2015-189591 filed on Sep. 28, 2015, the content of which is hereby incorporated by reference into this application.

BACKGROUND

Technical Field

The disclosure relates to a fuel supply apparatus.

Related Art

A fuel supply apparatus has been conventionally known to introduce a liquid fuel supplied from a fueling nozzle to a fuel tank of a motor vehicle. For example, JP 2009-83569A describes a fuel supply apparatus comprising a breather port that is provided separately from a fuel passage which a liquid fuel supplied from a fueling nozzle to a fuel tank passes through and is configured to circulate fuel vapor generated by vaporization of the liquid fuel in the fuel tank between the fuel supply apparatus and the fuel tank. JP 2015-143043A describes a filler pipe configured to receive a supplied liquid fuel and have ribs that are formed on an outer circumferential surface of a tubular retainer mounted to inside of the filler pipe to be protruded on a normal line.

The fuel vapor flowing from the fuel tank through the breather port to the fuel supply apparatus joins with the liquid fuel supplied from the fueling nozzle during fueling. There is a demand to cause the fuel vapor to smoothly join with the supplied liquid fuel, with a view to preventing the fuel vapor from flowing out of the motor vehicle when the fuel vapor joins with the supplied liquid fuel in the fuel supply apparatus. The fuel supply apparatus described in JP 2009-83569A, however, has a likelihood that the fuel vapor does not smoothly join with the supplied liquid fuel. There is accordingly still a room for improvement with regard to the configuration of the fuel supply apparatus. The filler pipe described in JP 2015-143043A allows the fuel vapor flowing through the breather port into the filler pipe to be introduced in the fuel tank direction where the fuel tank is placed, by the ribs formed on the outer circumferential surface of the retainer. This configuration, however, does not sufficiently achieve the demand to cause the fuel vapor to smoothly join with the supplied liquid fuel.

SUMMARY

In order to solve at least part of the problems described above, the disclosure may be implemented by aspects or configurations described below.

(1) According to one aspect, there is provided a fuel supply apparatus. The fuel supply apparatus comprises a filler neck body including a hollow fuel passage-forming structure configured to form a fuel passage which a supplied fuel passes through, and a fuel vapor port branched off from the fuel passage-forming structure; and a nozzle guide located inside of the filler neck body and formed in a tubular shape to introduce a fueling nozzle that is inserted into a main body opening of the filler neck body and provided to supply the fuel, in a tank direction from the main body opening of the filler neck body toward a fuel tank. A vapor flow path is formed to be continuous with the fuel vapor port and introduce fuel vapor flowing into the fuel vapor port in the tank direction. The fuel supply apparatus of this aspect suppresses the fuel vapor introduced in tank direction from flowing out to the atmosphere from a filler port provided to receive the fueling nozzle inserted therein and located on the opposite side in the tank direction. The fuel vapor introduced in the tank direction at an appropriate volume of volume and at an appropriate flow rate smoothly joins with the liquid fuel supplied from the fueling nozzle without collision. This configuration suppresses the reverse flow of the liquid fuel and outflow of the splash of the liquid fuel from the filler port due to the collision of the fuel vapor with the liquid fuel.

(2) In the fuel supply apparatus of the above aspect, two ribs protruded outward and arranged with the fuel vapor port placed therebetween and a restriction portion provided on an opposite side to the fuel vapor port in the tank direction and configured to connect with the two ribs may be provided on an outer surface of the nozzle guide. The vapor flow path may be formed by the two ribs, the restriction portion, part of the outer surface of the nozzle guide provided to connect the two ribs with the restriction portion, and part of an inner surface of the filler neck body and may be configured to communicate with the fuel vapor port. The fuel supply apparatus of this aspect enables the vapor flow path to be provided by the simple configuration.

(3) In the fuel supply apparatus of the above aspect, the two ribs may be formed parallel to each other along an axis of the nozzle guide and may be arranged to be opposed to each other. The fuel supply apparatus of this aspect causes the fuel vapor flowing through the fuel vapor port into the vapor flow path to be adjusted to an appropriate volume of flow and an appropriate flow rate before introducing the fuel vapor to ends the two ribs in the tank direction.

(4) In the fuel supply apparatus of the above aspect, a length between a center of a branch hole at which the fuel vapor port is branched off from the fuel passage-forming structure and ends of the two ribs in the tank direction along the axis of the nozzle guide may be greater than a distance between the two ribs opposed to each other. The fuel supply apparatus of this aspect causes the fuel vapor flowing through the fuel vapor port into the vapor flow path to be adjusted to an appropriate volume of flow and an appropriate flow rate before introducing the fuel vapor to the ends the two ribs in the tank direction.

(5) In the fuel supply apparatus of the above aspect, a distance between the two ribs opposed to each other may be equal to a diameter of a branch hole at which the fuel vapor port is branched off from the fuel passage-forming structure. The fuel supply apparatus of this aspect causes the fuel vapor flowing through the fuel vapor port into the vapor flow path to be adjusted to an appropriate volume of flow and an appropriate flow rate before introducing the fuel vapor to ends the two ribs in the tank direction.

(6) In the fuel supply apparatus of the above aspect, heights of the two ribs from the outer surface of the nozzle guide may be equal to a distance from the outer surface of the nozzle guide to the inner surface of the filler neck. The fuel supply apparatus of this aspect causes the fuel vapor flowing through the fuel vapor port into the vapor flow path to be adjusted to a more appropriate volume of flow and a more appropriate flow rate without being diffused in the circumferential direction before reaching downstream ends of the two ribs.

(7) In the fuel supply apparatus of the above aspect, the nozzle guide may have a nozzle stopper provided at an end in the tank direction to be protruded toward an inner circumferential side. In the fuel supply apparatus of this aspect, positioning by the nozzle stopper determines the position where the fuel vapor passing through the vapor flow path joins with the liquid fuel supplied from the fueling nozzle. This configuration enables the fuel vapor to more smoothly join with the liquid fuel.

(8) In the fuel supply apparatus of the above aspect, the vapor flow path may be a tubular space. The fuel supply apparatus of this aspect enables the fuel vapor flowing into the vapor flow path to be more appropriately introduced in the tank direction.

The disclosure may be implemented by any of various aspects other than the fuel supply apparatus, for example, a motor vehicle equipped with the fuel supply apparatus and a method of manufacturing the fuel supply apparatus.

The configuration of the fuel supply apparatus according to any of the above aspects causes the fuel vapor introduced downstream in the fuel supply apparatus to join with the liquid fuel that is supplied from the fueling nozzle and flows through the fuel passage, at an appropriate volume of flow and at an appropriate flow rate. This suppresses the fuel vapor introduced downstream from flowing out to the atmosphere from the upstream-side filler port in which the fueling nozzle is inserted. The fuel vapor introduced downstream at the appropriate volume of flow and at the appropriate flow rate smoothly joins with the liquid fuel supplied from the fueling nozzle without collision. This configuration suppresses the reverse flow of the liquid fuel and outflow of the splash of the liquid fuel from the filler port due to the collision of the fuel vapor with the liquid fuel.

DESCRIPTION OF EMBODIMENTS

A. Embodiment (1) General Configuration of Fuel Supply Apparatus FS

Figure 1:
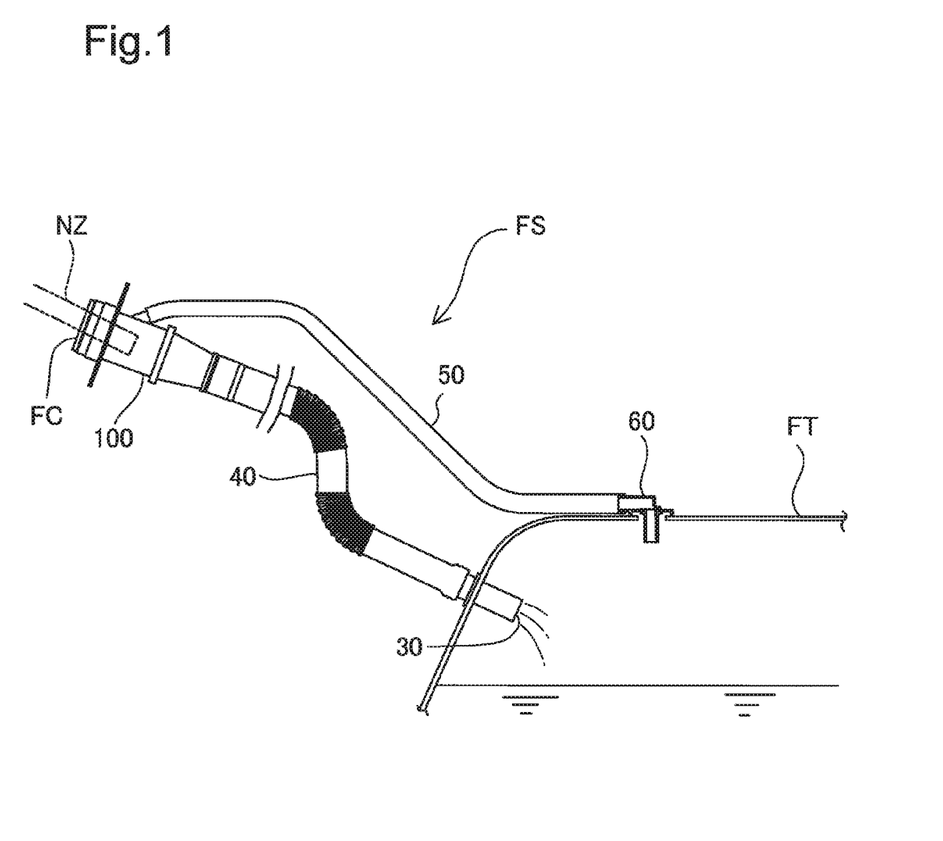
FIG. 1 is a schematic diagram illustrating a fuel supply apparatus configured to connect a fueling nozzle for supplying a fuel with a fuel tank mounted inside of a motor vehicle.
Figure 2A:
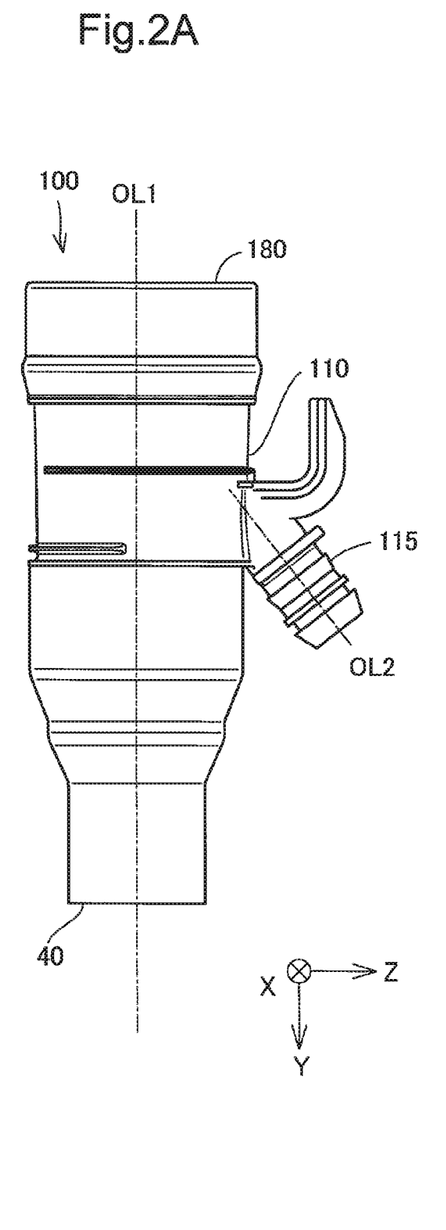
FIG. 2A is a front view illustrating a filler neck with which a filler tube is connected.
Figure 2B:
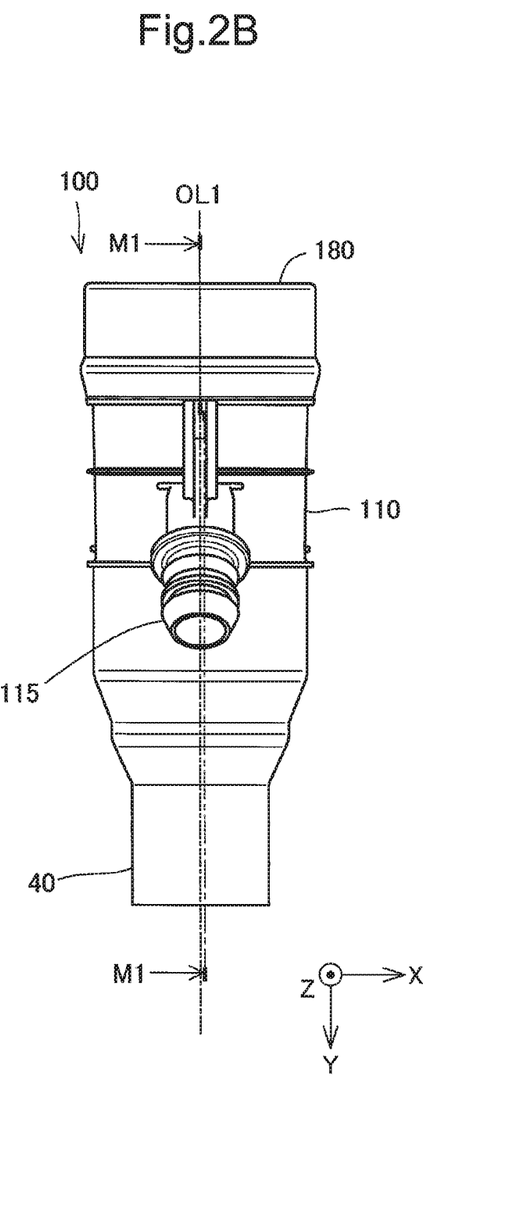
FIG. 2B is a right side view illustrating the filler neck with which the filler tube is connected.
Figure 3:
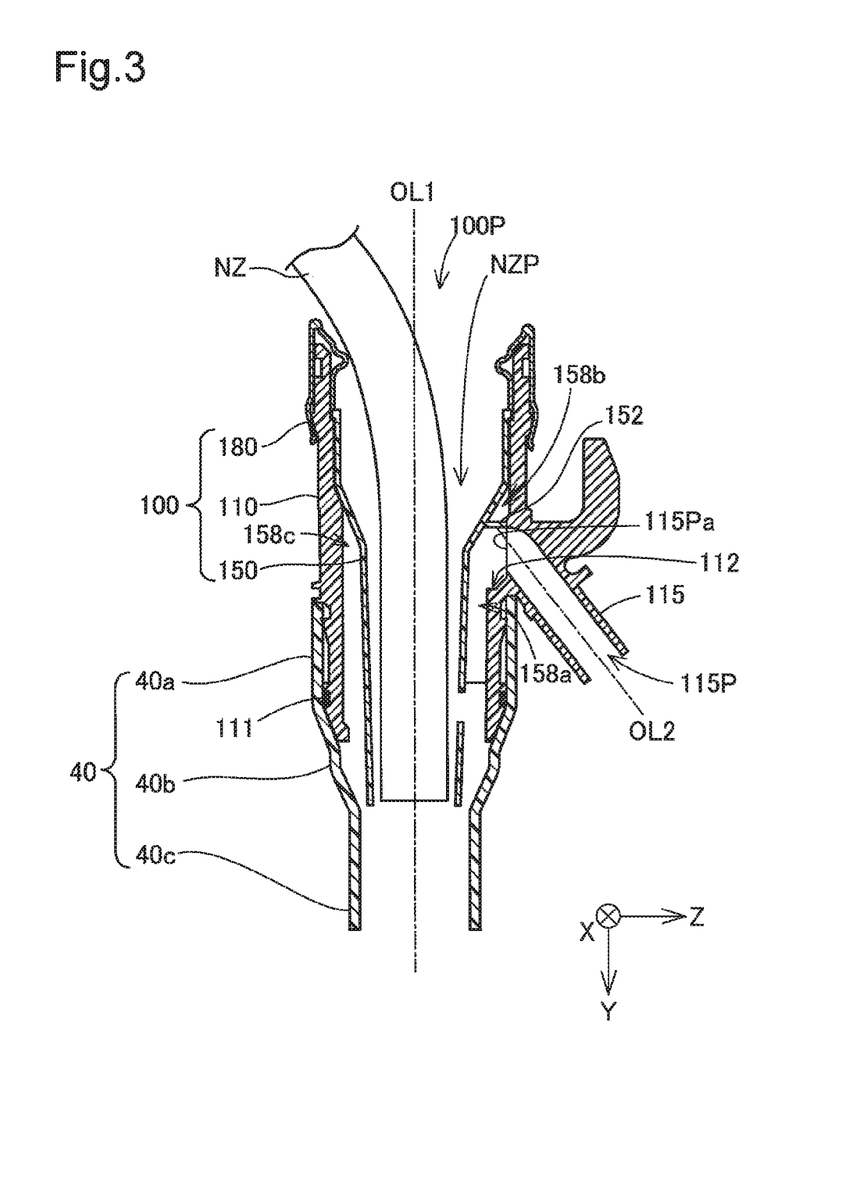
FIG. 3 is a sectional view illustrating the filler neck with which the filler tube is connected.
Figure 4:
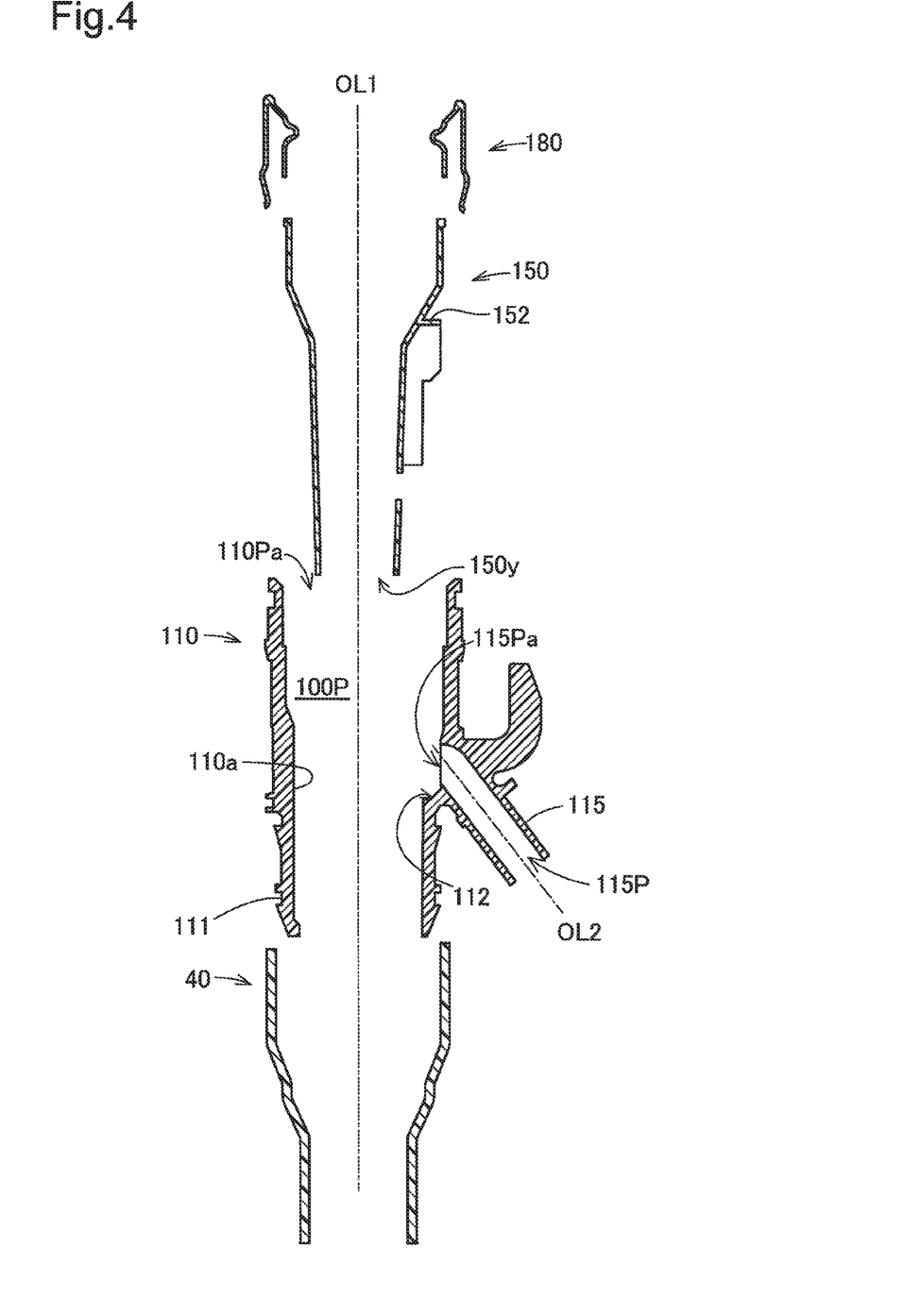
FIG. 4 is an exploded sectional view illustrating the filler tube and the filler neck.

FIG. 1 is a schematic diagram illustrating a fuel supply apparatus FS configured to connect a fueling nozzle NZ for supplying a fuel with a fuel tank FT mounted inside of a motor vehicle. The fuel supply apparatus FS includes a filler neck 100, a filler tube 40, a breather pipe 50, a flow control valve 60 and a check valve 30. The filler neck 100 and the fuel tank FT are connected by the filler tube 40 and the breather pipe 50. The filler tube 40 is connected with the fuel tank FT via the check valve 30. The breather pipe 50 is connected with the fuel tank FT via the flow control valve 60. The breather pipe 50 is located above the filler tube 40 in the vertical direction, so that the supplied fuel passes through the filler tube 40 and does not flow into the breather pipe 50. The fuel vapor generated by vaporization of the fuel in the fuel tank FT flows from the fuel tank FT through the breather pipe 50 and is returned to a fuel passage formed in the filler neck 100. The direction from the filler neck 100 toward the fuel tank FT corresponds to the tank direction in the claims. In the description below, the direction from the filler neck 100 toward the fuel tank FT may be simply called "downstream direction" or "downstream side", and the opposite direction may be called "upstream direction" or "upstream side", FIG. 2A and FIG. 2B are appearance diagrams illustrating the filler neck 100 with which the filler tube 40 is connected. FIG. 3 is a sectional view illustrating the filler neck 100 with which the filler tube 40 is connected. FIG. 4 is an exploded sectional view illustrating the filler tube 40 and the filler neck 100. More specifically FIG. 2A is a front view illustrating the filler neck 100 with which the filler tube 40 is connected. FIG. 2B is a right side view illustrating the filler neck 100 with which the filler tube 40 is connected. FIG. 3 is a sectional view illustrating a section M1 in FIG. 2B. FIG. 4 is an exploded sectional view illustrating the respective components in the sectional view of FIG. 3.

As shown in FIG. 3, the filler neck 100 includes a filler neck body 110, a mouthpiece 180 provided to cover an upstream side of the filler neck body 110 and a nozzle guide 150 placed inside of the filler neck body 110. According to this embodiment, the filler tube 40 (connected with the fuel tank FT)-side of the filler neck 100 is called downstream side (positive Y'axis direction in FIG. 2A and FIG. 2B), and the fuel supply side of the filler neck 100 is called upstream side (negative Y-axis direction in FIG. 2A and FIG. 2B). According to this embodiment, the direction from the upstream side to the downstream side of the fuel passage 100P which the fuel supplied to the filler neck 100 passes through is defined as positive Y-axis direction. The direction that is parallel to a plane perpendicular to an axis OL1 passing through the center of the fuel passage 100P and crosses the axis OL1 and an axis OL2 of a breather port 115 described later is defined as positive Z-axis direction. An axis orthogonal to the Y axis and the Z axis is defined as an X axis.

As shown in FIG. 3, the filler neck body 110 is formed in a cylindrical shape along the axis OL1 that connects the upstream side with the downstream side. As shown in FIG. 4, the filler neck body 110 has an inner circumferential surface 110a configured to internally form the fuel passage 100P which the supplied fuel passes through. The sectional area of the fuel passage 100P decreases toward the downstream side. The filler neck body 110 is formed from a resin material. As shown in FIG. 2B and FIG. 3, the filler neck body 110 has a breather port 115 that is branched off in the direction from the upstream side to the downstream side. As shown in FIG. 3 and FIG. 4, the filler neck body 110 has a corrugated portion 111 formed in a corrugated pattern on its outer circumferential surface on the downstream side to allow the filler tube 40 to be press-fit on. As shown in FIG. 4, the filler neck body 110 has a main body step 112 on the downstream side of a joint of the breather port 115 with the filler neck body 110. The main body step 112 comes into contact with a first rib step 153a and a second rib step 154a of the nozzle guide 150 described later to position the nozzle guide 150 located inside of the filler neck body 110 along the axis OL1.

As shown in FIG. 3 and FIG. 4, the breather port 115 of the filler neck body 110 is connected with the breather pipe 50 (shown in FIG. 1) to form an introduction passage 115P that is arranged to introduce the fuel vapor returned from the fuel tank FT through the breather pipe 50 into the fuel passage 100P. As shown in FIG. 4, the introduction passage 115P denotes a space formed about the axis OL2 inside of the breather port 115.

The filler neck 100 is manufactured by placing the nozzle guide 150 inside of the filler neck body 110 and subsequently fitting the mouthpiece 180 at an opening 110Pa of the filler neck body 110.

The mouthpiece 180 is a member provided to cover the circular opening 110Pa on the upstream side of the filler neck body 110. The mouthpiece 180 is made of metal.

As shown in FIG. 3, the nozzle guide 150 is a cylindrical member fit and placed inside of the filler neck body 110. The nozzle guide 150 has an inner circumferential surface arranged to form a nozzle guide path NZP as part of the fuel passage 100P. The inner circumferential surface of the nozzle guide 150 is formed to decrease the sectional area from the upstream side toward the downstream side. The nozzle guide path NZP formed to decrease the sectional area from the upstream side toward the downstream side causes a leading end of the fueling nozzle NZ inserted into the fuel passage 100P to be introduced toward the downstream side of the fuel passage 100P.

As shown in FIG. 3, the nozzle guide 150 has a vapor guide structure 152 configured to cause the fuel vapor that passes through the introduction passage 115P and an introduction opening 115Pa crossing the main body step 112 and is introduced to the filler neck body 110 to be introduced toward the downstream side. The vapor guide structure 152 and the inner circumferential surface 110a of the filler neck body 110 are arranged to connect the introduction passage 115P with the fuel passage 100P and form a vapor flow path 158a as a space causing the introduction passage 115P to communicate with the fuel passage 100P. In other words, the vapor flow path 158a is formed to be continuous with the breather port 115. A space 158b that does not directly communicate with the introduction passage 115P is formed with the vapor guide structure 152 as the boundary on the upstream side of the vapor flow path 158a by the vapor guide structure 152 and the inner circumferential surface 110a of the filler neck body 110. A space 158c is formed by an outer circumferential surface of the nozzle guide 150 and the inner circumferential surface 110a of the filler neck body 110 at a position symmetrical to the vapor flow path 158a (i.e., at a position on the negative Z-axis direction side) with respect to the axis OL1. The vapor flow path 158a, the space 158b and the space 158c are spaces formed by the outer circumferential surface of the nozzle guide 150 and the inner circumferential surface 110a of the filler neck body 110 to communicate with one another by a labyrinthine structure. The labyrinthine structure of this embodiment denotes an intricate structure and more specifically means a structure configured by complicated passages that do not simply communicate with each other by a linear passage. The detailed configuration of the vapor guide structure 152 and the detailed configuration of the vapor flow path 158a will be described later.

As shown in FIG. 3, the filler tube 40 includes a press-fit portion 40a that is press-fit on the corrugated portion 111 of the filler neck 100, a middle portion 40b that is connected with the downstream side of the press-fit portion 40a and an inflow portion 40c that is connected with the downstream side of the middle portion 40b. The middle portion 40b is tapered to decrease the diameter toward the downstream end of the corrugated portion 111 to have the inner diameter approximately equal to the diameter of the inner circumference of the corrugated portion 111 of the filler neck body 110. The inflow portion 40c forms part of the fuel passage 100P that is extended from a lower end 150y of the nozzle guide 150 (described later with reference to FIG. 5) to the fuel tank FT and has the diameter equal to the smallest diameter of the middle portion 40b at the lower end 150y of the nozzle guide 150. In other words, the middle portion 40b is protruded toward the downstream side of the corrugated portion 111 to have the diameter larger than the diameter of the inflow portion 40c. The inner circumference of the inflow portion 40c is eccentrically arranged at the lower end 150y of the nozzle guide 150 that is on the lower side in the vertical direction of the vehicle when the fuel supply apparatus FS is mounted on the vehicle, to be smoothly connected with the inner circumference of the filler neck 100 on the opposite side (negative Z-axis direction) to the breather port 115-side. A seal ring (not shown) is placed between the corrugated portion 111 of the filler neck body 110 and the filler tube 40 to prevent leakage of the liquid fuel and the fuel vapor to outside.

(2) Detailed Configuration of Vapor Flow Path 158a

Figure 5:
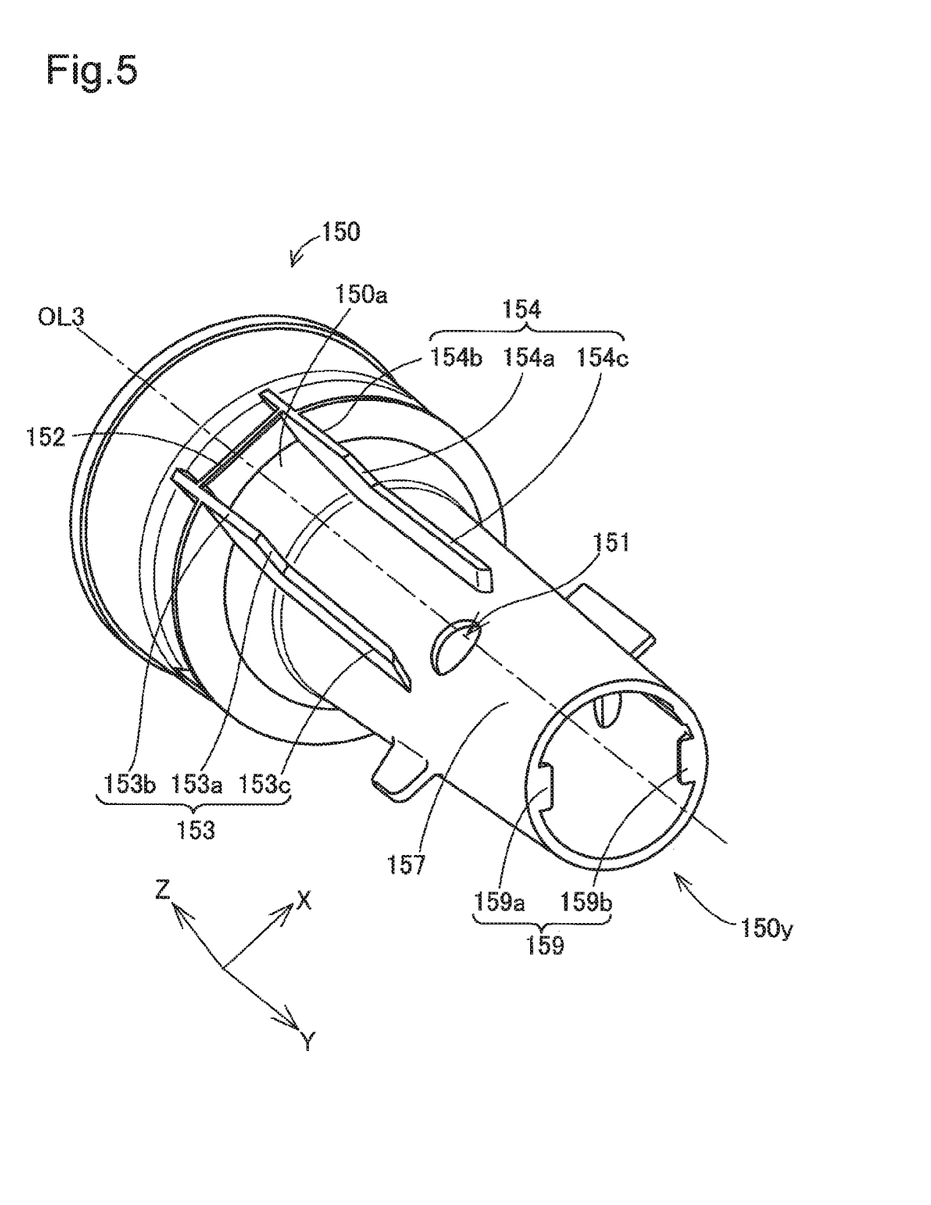
FIG. 5 is a perspective view illustrating a nozzle guide configured to form a vapor flow path.
Figure 6:
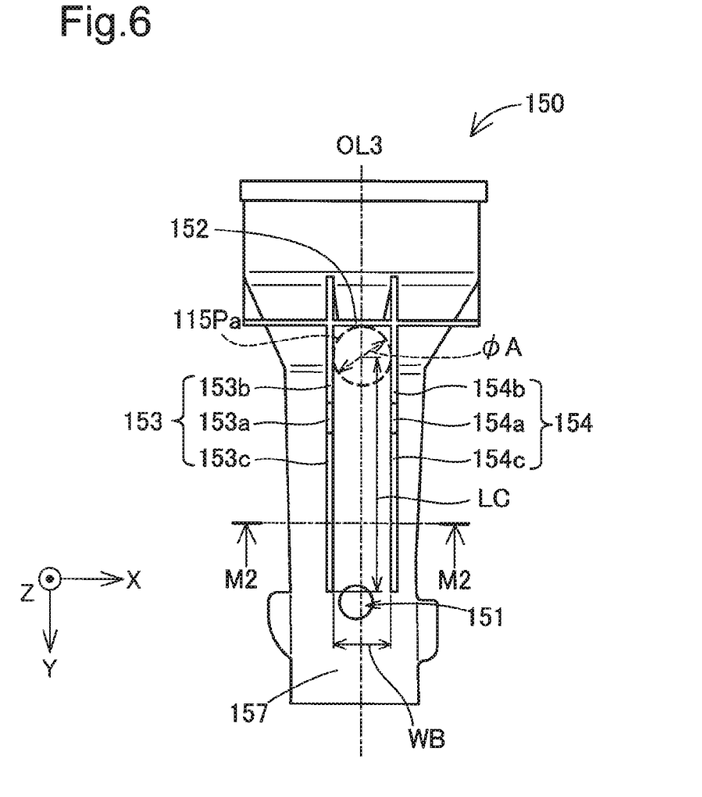
FIG. 6 is a front view illustrating the nozzle guide configured to form the vapor flow path.

FIG. 5 is a perspective view illustrating the nozzle guide 150 configured to form the vapor flow path 158a. FIG. 6 is a front view illustrating the nozzle guide 150 configured to form the vapor flow path 158a. As described above, the vapor flow path 158a is formed by part of the outer surface of the nozzle guide 150 and part of the inner surface of the filler neck body 110. As shown in FIG. 5 and FIG. 6, a first rib 153 and a second rib 154 are formed on the outer surface of the nozzle guide 150 to be connected with the vapor guide structure 152. The first rib 153 and the second rib 154 are protruded along a YZ plane from the outer surface of the nozzle guide 150 to be parallel to each other. The first rib 153 and the second rib 154 are accordingly arranged to be opposed to each other. The vapor guide structure 152 is arranged parallel to a ZX plane, so that the first rib 153 and the second rib 154 are arranged perpendicular to the vapor guide structure 152. The nozzle guide 150 is placed inside of the filler neck body 110, such that the axis OL2 of the breather port 115 is located on a YZ plane passing through an intermediate axis OL3 between the first rib 153 and the second rib 154 opposed to each other. In other words, the position of the nozzle guide 150 is adjusted relative to the filler neck body 110, such that the axis OL2 is located on the plane between the first rib 153 and the second rib 154. The first rib 153 and the second rib 154 are formed in the same shape about the intermediate axis OL3. According to this embodiment, the vapor flow path 158a serves to regulate the flow of fuel vapor flowing in from the breather port 115, so that part of an outer circumferential surface 150a of the nozzle guide 150 arranged to face the introduction opening 115Pa has no projections such as ribs.

As shown in FIG. 5 and FIG. 6, the first rib 153 includes a first rib step 153a, an upstream-side first rib 153b located on the upstream side of the first rib step 153a and a downstream-side first rib 153c located on the downstream side of the first rib step 153a. The first rib step 153a, the upstream-side first rib 153b and the downstream-side first rib 153c are protruded along the intermediate axis OL3 from the outer surface of the nozzle guide 150 (outer circumferential surface 150a) to have different amounts of protrusion. The first rib step 153a comes into contact with the main body step 112 of the filler neck body 110 (shown in FIG. 4) when the nozzle guide 150 is placed inside of the filler neck body 110. The first rib step 153a is accordingly formed in a shape matching with the main body step 112. The upstream-side first rib 153b is formed to have a constant distance from the axis OL1. In other words, the protrusion amount of the upstream-side first rib 153b from the outer circumferential surface 150a is determined to provide a fixed diameter about the axis OL1. The protrusion amount of the upstream-side first rib 153b is determined to such a dimension that the upstream-side first rib 153b comes into contact with the inner circumferential surface 110a of the filler neck body 110. The downstream-side first rib 153c is formed to have a constant distance from the axis OL1 and to be smaller than the distance of the upstream-side first rib 153b from the axis OL1. Like the upstream-side first rib 153b, the protrusion amount of the downstream-side first rib 153c from the outer circumferential surface 150a is determined to such a dimension that the downstream-side first rib 153c comes into contact with the inner circumferential surface 110a of the filler neck body 110. Neither the first rib 153 nor the second rib 154 (described later) is extended to reach the lower end 150y of the nozzle guide 150. A circular hole 151 and a downstream surface 157 as part of the outer circumferential surface 150a of the nozzle guide 150 are provided on the downstream side of a downstream end of the first rib 153 and a downstream end of the second rib 154. The downstream surface 157 has no protrusions such as ribs.

According to this embodiment, the second rib 154 is formed in the same shape as that of the first rib 153 about the intermediate axis OL3. Accordingly the second rib 154 includes a second rib step 154a formed in the same shape as that of the first rib step 153a, an upstream-side second rib 154b formed in the same shape as that of the upstream-side first rib 153b, and a downstream-side second rib 154c formed in the same shape as that of the downstream-side first rib 153c.

The first rib step 153a and the second rib step 154a are configured to come into contact with the main body step 112 of the filler neck body 110. The configuration that the first rib step 153a and the second rib step 154a come into contact with the main body step 112 regulates the position of and restricts the downstream motion of the nozzle guide 150 placed inside of the filler neck body 110. In other words, the main body step 112, the first rib step 153a and the second rib step 154a position the nozzle guide 150 relative to the filler neck body 110 along the axis OL1.

As shown in FIG. 5 and FIG. 6, the circular hole 151 is formed in the nozzle guide 150 on the downstream side of the first rib 153 and the second rib 154. The circular hole 151 is provided perpendicular to the axis OL1 to pass through part of the nozzle guide 150. The circular hole 151 accordingly makes the vapor flow path 158a communicate with the fuel passage 100P. The upstream end of the circular hole 151 is located on the upstream side of the downstream ends of the first rib 153 and the second rib 154. According to this embodiment, a center axis of the circular hole 151 along the axis OL1 is different from the intermediate axis OL3 between the first rib 153 and the second rib 154.

FIG. 6 shows the position of the introduction opening 115Pa of the breather port 115 projected on the outer circumferential surface 150a of the nozzle guide 150 when the nozzle guide 150 is placed inside of the filler neck body 110, in addition to the front view of the nozzle guide 150. FIG. 6 also illustrates the dimensional relationship of the introduction opening 115Pa to the first rib 153 and the second rib 154. The introduction opening 115Pa is in a circular shape and has a diameter of $\phi A$. A width WB denotes the distance between the first rib 153 and the second rib 154 and is set to be approximately the same as the diameter $\phi A$ of the introduction opening 115Pa according to this embodiment. A length LC denotes the distance from the center of the introduction opening 115Pa to the downstream end of the first rib 153 along the intermediate axis OL3 and is set to be greater than the width WB. A stopper 159 shown in FIG. 5 will be described later.

Figure 7:
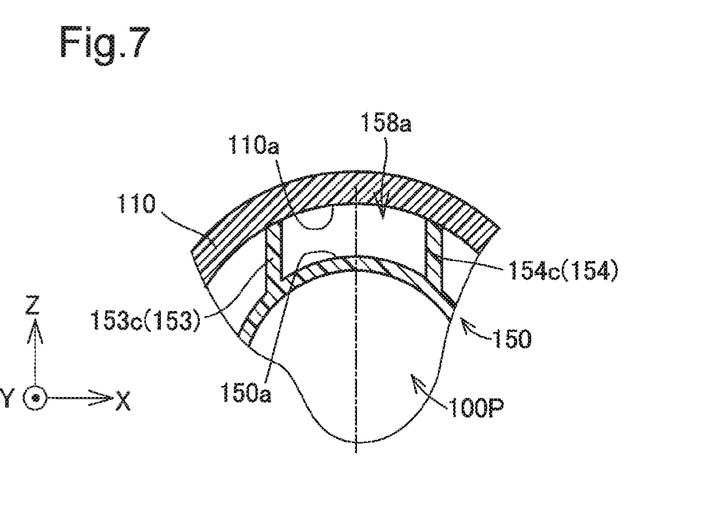
FIG. 7 is a sectional view illustrating a filler neck body and the nozzle guide.

FIG. 7 is a sectional view illustrating the filler neck body 110 and the nozzle guide 150. More specifically, FIG. 7 is an enlarged view illustrating part of a section M2 in FIG. 6 in the state that the nozzle guide 150 is placed inside of the filler neck 100. As shown in FIG. 7, the vapor flow path 158a is formed by the downstream-side first rib 153c of the first rib 153, the downstream-side second rib 154c of the second rib 154, part of the outer circumferential surface 150a of the nozzle guide 150 and part of the inner circumferential surface 110a of the filler neck body 110. The vapor flow path 158a is a tubular space along the Y axis. The outer circumferences of the downstream-side first rib 153c and the downstream-side second rib 154c come into contact with the inner circumferential surface 110a of the filler neck body 110. The fuel vapor flowing from the fuel tank FT through the introduction passage 115P passes through the vapor flow path 158a and flows into the fuel passage 100P.

(3) Detailed Configuration of Stopper 159

As shown in FIG. 5, stoppers 159 are formed at the lower end 150y of the nozzle guide 150 to be protruded inward from the inner circumferential surface of the nozzle guide 150. The stoppers 159 include a first stopper 159a and a second stopper 159b. The first stopper 159a and the second stopper 159b are formed to be symmetrical with respect to the axis OL1 of the filler neck body 110 at the lower end 150y of the nozzle guide 150 having a circular section. The distance between the first stopper 159a and the second stopper 159b is set to be smaller than the diameter of the leading end of the fueling nozzle NZ inserted into the filer neck 100 to supply the fuel through the fuel supply apparatus FS. This configuration prevents the leading end of the fueling nozzle NZ inserted into the filler neck 100 during fueling from going beyond the stoppers 159 into the downstream. In other words, the stoppers 159 serve as members to restrict the position of the fueling nozzle NZ inserted into the filler neck 100. Depending on the length and the shape of the fueling nozzle NZ, the leading end of the fueling nozzle NZ inserted into the filler neck 100 may not reach the stoppers 159 of the nozzle guide 150 but may be held in the middle of the nozzle guide 150 before the stoppers 159. Even in the case of such shallow insertion of the fueling nozzle NZ into the nozzle guide 150, the nozzle guide 150 introduces the liquid fuel supplied from the fueling nozzle NZ downstream and serves as an extension of the fueling nozzle NZ.

(4) Functions and Advantageous Effects of Vapor Flow Path 158a

The configuration of the embodiment described above provides the following advantageous effects.

Figure 8:
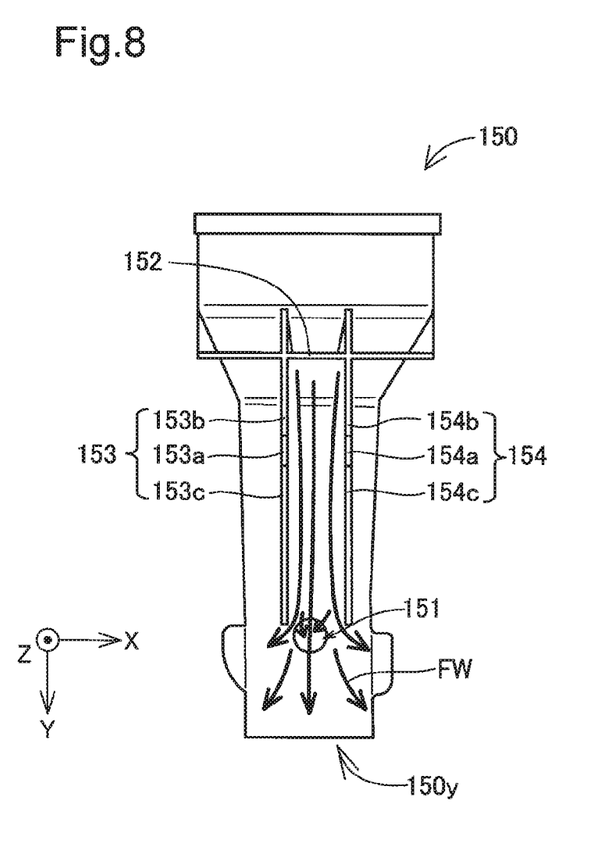
FIG. 8 is a conceptual diagram schematically illustrating the flow of fuel vapor.

FIG. 8 is a conceptual diagram schematically illustrating the flow of fuel vapor. FIG. 8 illustrates the nozzle guide 150 with flow FW of the fuel vapor passing through the introduction path 115P of the filler neck body 110 and flowing into the vapor flow path 158a. The flow FW of the fuel vapor is shown by a plurality of thick arrows in FIG. 8. The fuel vapor flowing into the vapor flow path 158a is introduced downstream by the vapor guide structure 152. The first rib 153 and the second rib 154 introduce the fuel vapor downstream to the lower ends of the downstream-side first rib 153c and the downstream-side second rib 154b without diffusion of the fuel vapor in the circumferential direction of the nozzle guide 150. Subsequently the fuel vapor may pass through the circular hole 151 to be introduced into the fuel passage 100P, may diffuse in the circumferential direction of the nozzle guide 150 and may flow to the lower end 150y of the nozzle guide 150.

As described above, in the fuel supply apparatus FS of the embodiment, the fuel vapor flowing in through the introduction passage 115P is introduced downstream by the vapor flow path 158a formed to be continuous with the breather port 115. The vapor flow path 158a causes the introduced fuel vapor to join with the liquid fuel that is supplied from the fueling nozzle NZ and flows through the fuel passage loop, at an appropriate volume of flow and at an appropriate flow rate. The fuel supply apparatus FS of the embodiment accordingly suppresses the fuel vapor introduced downstream from flowing out to the atmosphere from the upstream-side filler port in which the fueling nozzle NZ is inserted. The fuel vapor introduced downstream at the appropriate volume of flow and at the appropriate flow rate smoothly joins with the liquid fuel supplied from the fueling nozzle NZ without collision. This configuration suppresses the reverse flow of the liquid fuel and outflow of the splash of the liquid fuel from the filler port due to the collision of the fuel vapor with the liquid fuel. The first rib 153 and the second rib 154 enhance the strength against an external force applied to the nozzle guide 150.

In the fuel supply apparatus FS of the embodiment, the vapor flow path 158a is formed by the first rib 153, the second rib 154, the vapor guide structure 152, part of the inner circumferential surface 110a of the filler neck body 110 and part of the outer circumferential surface 150a of the nozzle guide 150. The fuel supply apparatus FS of the embodiment accordingly has the vapor flow path 158a that is provided by the simple configuration.

In the fuel supply apparatus FS of the embodiment, the first rib 153 and the second rib 154 are formed along the axis OL1 of the nozzle guide 150 to be parallel to each other and to be opposed to each other. The length LC of the first rib 153 along the axis OL1 and the length LC of the second rib 154 along the axis OL1 are greater than the width WB between the first rib 153 and the second rib 154 opposed to each other. The width WB between the first rib 153 and the second rib 154 opposed to each other is approximately equal to the diameter φA of the introduction opening 115Pa of the breather port 115. In the fuel supply apparatus FS of the embodiment, the fuel vapor flowing through the breather port 115 into the vapor flow path 158a is accordingly regulated to the appropriate volume of flow and the appropriate flow rate before being introduced to the downstream ends of the first rib 153 and the second rib 154.

In the fuel supply apparatus FS of the embodiment, the first rib 153 and the second rib 154 are protruded from the outer circumferential surface 150a of the nozzle guide 150 to come into contact with the inner circumferential surface 110a of the filler neck body 110. This configuration forms the vapor flow path 158a as a sealed tubular space along the axis OL1. In the fuel supply apparatus FS of the embodiment, the fuel vapor flowing through the breather port 115 into the vapor flow path 158a is accordingly regulated to the more appropriate volume of flow and the more appropriate flow rate without diffusion in the circumferential direction before reaching the downstream ends of the first rib 153 and the second rib 154.

In the fuel supply apparatus FS of the embodiment, the stoppers 159 are provided at the lower end 150y of the nozzle guide 150 to be protruded inward from the inner circumferential surface of the nozzle guide 150. The fueling nozzle NZ inserted into the fuel supply apparatus FS abut on the stoppers 159 and accordingly do not go beyond the stoppers 159 into the downstream. In the fuel supply apparatus FS of the embodiment, positioning by the stoppers 159 determines the position where the fuel vapor passing through the vapor flow path 158a joins with the liquid fuel supplied from the fueling nozzle NZ. This configuration enables the fuel vapor to more smoothly join with the liquid fuel.

In the fuel supply apparatus FS of the embodiment, the vapor flow path 158a is provided as the tubular space that communicates with another space by only the introduction opening 115Pa and the downstream end. This configuration enables the fuel vapor flowing in from the introduction opening 115Pa to be more appropriately introduced downstream.

B. Modifications

The disclosure is not limited to the above embodiment but may be implemented by any of various other aspects without departing from the scope of the disclosure. Some of possible modifications are given below.

B-1. Modification 1

The configuration of the stoppers 159 provided to position the fueling nozzle NZ inserted into the filler neck 100 is not limited to the above embodiment but may be modified in any of various ways. For example, only the first stopper 159a may be provided. In another example, a net-like separate member may be placed at the lower end 150y of the nozzle guide 150 with a view to positioning the fueling nozzle NZ. In another example, the nozzle guide 150 may not be provided with the stoppers 159 that restrict the position of the fueling nozzle NZ.

B-2. Modification 2

The above embodiment describes one example of the dimensional relationship with regard to the diameter φA of the introduction opening 115Pa, the width WB between the first rib 153 and the second rib 154, and the length LC of the first rib 153 and the second rib 154 along the axis OL1 as shown in FIG. 6. The dimensional relationship may however, be changed in any of various ways. For example, the diameter φA of the introduction opening 115Pa may be different from the width WB between the first rib 153 and the second rib 154. The width WB between the first rib 153 and the second rib 154 is preferably not less than the diameter φA of the introduction opening 115Pa. Additionally the width WB between the first rib 153 and the second rib 154 is preferably not greater than twice the diameter φA of the introduction opening 115Pa. The width WB between the first rib 153 and the second rib 154 is also preferably smaller than the diameter of the nozzle guide 150 at a section perpendicular to the axis OL1 passing through the center of the introduction opening 115Pa. The length LC of the first rib 153 and the second rib 154 along the axis OL1 is greater than the width WB between the first rib 153 and the second rib 154 according to the above embodiment but may be not greater than the width WB. The length LC of the first rib 153 and the second rib 154 along the axis OL1 is preferably not less than twice the width WB between the first rib 153 and the second rib 154.

According to the above embodiment, as shown in FIG. 6, the nozzle guide 150 has the circular hole 151 formed near to the downstream ends of the first rib 153 and the second rib 154. The configuration of the circular hole 151 may however, be changed in any of various ways. The nozzle guide 150 may not have the circular hole 151. The circular hole 151 may be formed in a rectangular shape. The upstream end of the circular hole 151 is located on the upstream side of the downstream ends of the first rib 153 and the second rib 154 according to the above embodiment but may be located on the downstream side.

The first rib 153 and the second rib 154 are formed in the same shape about the intermediate axis OL3 according to the above embodiment but may not be necessarily formed in the same shape. For example, the downstream-side first rib 153c of the first rib 153 may be shorter along the axis OL1 than the downstream-side second rib 154c of the second rib 154. The first rib 153 and the second rib 154 are arranged to be opposed to each other according to the above embodiment but may not be necessarily opposed to each other. For example, the first rib 153 and the second rib 154 may be protruded in the radial direction, so that the vapor flow path 158a shown in FIG. 7 may be formed to have an approximately trapezoidal section extended in the circumferential direction at the large-diameter portion.

B-3. Modification 3

The first rib 153 and the second rib 154 protruded from the outer circumferential surface 150a of the nozzle guide 150 are formed to come into contact with the inner circumferential surface 110a of the filler neck body 110 according to the above embodiment but may not necessarily come into contact with the inner circumferential surface 110a. The tubular vapor flow path 158a of the embodiment may be formed in any configuration that causes the first rib 153 and the second rib 154 to restrict part of the distance from the outer circumferential surface 150a of the nozzle guide 150 to the inner circumferential surface 110a of the filler neck body 110. For example, there may be a narrow clearance between the first and second ribs 153 and 154 and the inner circumferential surface 110a of the filler neck body 110, due to the tolerance between the filler neck body 110 and the nozzle guide 150. The protrusion amounts of the first rib 153 and the second rib 154 in the radial direction are preferably not lower than 70 percent (%) of the distance from the outer circumferential surface 150a of the nozzle guide 150 to the inner circumferential surface 110a of the filler neck body 110.

B-4. Modification 4

Figure 9:
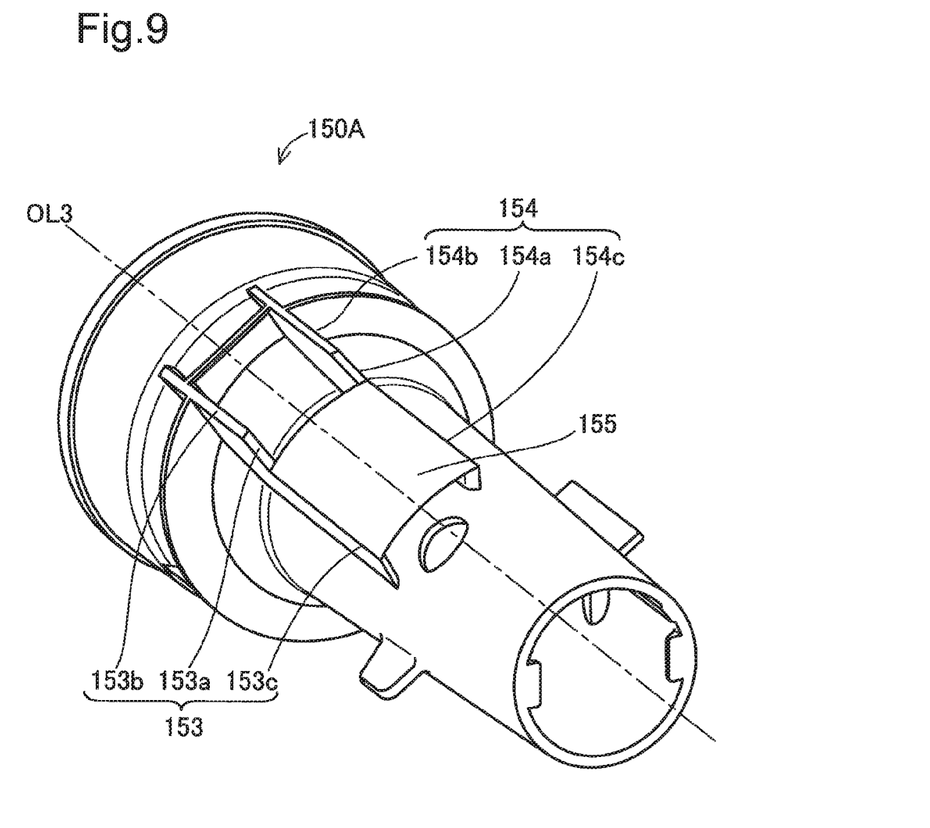
FIG. 9 is a perspective view illustrating a nozzle guide according to a modification.

FIG. 9 is a perspective view illustrating a nozzle guide 150A according to a modification. The nozzle guide 150A shown in FIG. 9 differs from the nozzle guide 150 of the above embodiment by the presence of a flow path cover 155 and otherwise has the similar configuration to that of the nozzle guide 150 of the embodiment. As shown in FIG. 9, the flow path cover 155 is a member that is provided to connect the downstream-side first rib 153c with the downstream-side second rib 154c and thereby form a sealed vapor flow path 158a in the circumferential direction. The flow path cover 155 is formed as a circumferential surface along an arc about the axis OL1. In a filler neck 100A provided with the nozzle guide 150A of this modification, the vapor flow path 158a may be formed without using an inner circumferential surface of a filler neck body 110A.

The vapor flow path 158a is not limited to the configuration of the above embodiment or Modification 4 but may be changed in any of various ways. For example, a separate member different from both the filler neck body 110 and the nozzle guide 150 may be used as the member forming the vapor flow path 158a. The vapor flow path 158a formed to be continuous with the breather port 115 in the description hereof denotes the vapor flow path 158a provided as the only flow path to allow the fuel vapor passing through the breather port 115 to flow through without making any branch flow of the fuel vapor. As described in Modification 3, the vapor flow path 158a formed to be continuous with the breather port 115 is not necessarily limited to the sealed space but includes a configuration that causes the fuel vapor to be diffused via a narrow clearance.

The disclosure is not limited to any of the embodiment, the examples and the modifications described above but may be implemented by a diversity of other configurations without departing from the scope of the disclosure. For example, the technical features of any of the embodiment, the examples and the modifications corresponding to the technical features of each of the aspects described in SUMMARY may be replaced or combined appropriately in order to solve part or all of the problems described above or in order to achieve part or all of the advantageous effects described above. Any of the technical features may be omitted appropriately unless the technical feature is described as essential herein.

The invention claimed is:

1. A fuel supply apparatus, comprising:
   a filler neck body including an inner circumferential surface that forms a fuel passage which a supplied fuel passes through, and a fuel vapor port branched off from the fuel pas sage-forming structure; and
   a nozzle guide located inside of the filler neck body and formed in a tubular shape to introduce a fueling nozzle that is inserted into a main body opening of the filler neck body and that is provided to supply the fuel, in a longitudinal direction of the filler neck body from the main body opening of the filler neck body toward a fuel tank, wherein
   a vapor flow path is formed to be continuous with the fuel vapor port and introduce fuel vapor flowing into the fuel vapor port in the longitudinal direction of the filler neck body,
   two ribs protruded outward and lengths of the two ribs extend along the longitudinal direction of the filler neck body with the fuel vapor port placed therebetween and a vapor guide structure provided on an opposite side to the fuel vapor port and configured to connect with the two ribs are provided on an outer surface of the nozzle guide,
   the vapor flow path is formed by the two ribs, the vapor guide structure, part of the outer surface of the nozzle guide provided to connect the two ribs with the restriction portion, and part of an inner surface of the filler neck body and is configured to communicate with the fuel vapor port, and
   heights of the two ribs from the outer surface of the nozzle guide are equal to a distance from the outer surface of the nozzle guide to the inner surface of the filler neck.

2. The fuel supply apparatus according to claim 1, wherein the two ribs are formed parallel to each other along an axis of the nozzle guide and are arranged to be opposed to each other.

3. The fuel supply apparatus according to claim 2,
wherein a length between a center of a branch hole at which the fuel vapor port is branched off from the fuel passage-forming structure and ends of the two ribs in the longitudinal direction of the filler neck body along the axis of the nozzle guide is greater than a distance between the two ribs opposed to each other.

4. The fuel supply apparatus according to claim 2,
wherein a distance between the two ribs opposed to each other is equal to a diameter of a branch hole at which the fuel vapor port is branched off from the fuel passage-forming structure.

5. The fuel supply apparatus according to claim 3,
wherein the distance between the two ribs opposed to each other is equal to a diameter of a branch hole at which the fuel vapor port is branched off from the fuel passage-forming structure.

6. The fuel supply apparatus according to claim 1,
wherein the nozzle guide has a nozzle stopper provided at an end in the longitudinal direction of the filler neck body to be protruded toward an inner circumferential side.

7. The fuel supply apparatus according to claim 1,
wherein the vapor flow path is a tubular space.

8. The fuel supply apparatus according to claim 6,
wherein the vapor flow path is a tubular space.

9. The fuel supply apparatus according to claim 1,
wherein the vapor flow path is a sealed tubular space.

10. The fuel supply apparatus according to claim 6,
wherein the vapor flow path is a sealed tubular space.

11. The fuel supply apparatus according to claim 1,
wherein
 the inner circumferential surface of the filler neck body has a main body step on a downstream side of the breather port, and
 the two ribs of the nozzle guide sit on the main body step of the filler neck body and contact the inner circumferential surface of the filler neck body to position the nozzle guide inside the filler neck body and seal the vapor flow path.

* * * * *